United States Patent Office 3,035,002
Patented May 15, 1962

3,035,002
PROCESS COMPRISING MILLING SILICA WITH A POLYMER CONTAINING A PLURALITY OF CARBOXYLIC ACID ESTER SIDE GROUPS
Donald Eugene Brasure, Tonawanda, N.Y., and Richard Dale Pruett, Wilmington, Del., assignors to E. I. du Pont de Nemours and Company, Wilmington, Del., a corporation of Delaware
No Drawing. Filed Feb. 17, 1959, Ser. No. 793,664
12 Claims. (Cl. 260—23)

This invention relates to new compositions of matter and, more particularly, to polymeric products containing chemically combined siliceous material, methods for their preparation, films manufactured from these novel polymeric products and articles coated and laminated with them.

This application is a continuation-in-part of our copending application Serial No. 602,397, filed August 6, 1956, now abandoned.

The use of siliceous particles in thermoplastic and thermosetting polymers to provide "reinforced" polymeric films, sheets, filaments and the like is known. In these applications, the siliceous particles are in mechanical admixture with the polymer, the polymer serving as a bonding material for the particles. Besides offering some beneficial effect upon certain physical properties of the polymeric material, the siliceous particles serve as a relatively inexpensive diluent, thus reducing the price of the reinforced product. However, the upper limit of the siliceous material that can be used in such mechanical mixtures without adversely affecting the physical properties of the product is low. The tensile strength, particularly, falls off sharply at relatively low concentrations of the siliceous particles.

The use of siliceous particles as "controllers" in the preparation of polymeric metallo-carboxylates is also known. However, in this use the siliceous particles (silica) serve merely to control the reaction of a metal-containing compound with a polymer to provide a product that appears smoother than it would if the siliceous particles had been omitted.

An object of the present invention is to provide an economical and effective process for chemically bonding siliceous particles and polymeric material together to provide an improved polymeric product. Another object is to cross-link the polymeric material through economical cross-linking agents. A further object is a process that provides a pliable, strong, self-supporting, substantially transparent polymeric film. Other objects will appear hereinafter.

The objects are accomplished by an essentially solid state process that involves a critical selection of the polymeric starting material, the siliceous material, the proportion of polymeric-to-siliceous material, and the conditions of the process.

Specifically, the process of the invention comprises contacting a saturated thermoplastic organic polymer with from 25% to 75%, based on the weight of the mixture, of finely-divided particles of silica as the sole cross-linking agent; the particles having their greatest dimension within the range of 0.001–0.1 micron, having a specific surface area of at least 100 square meters per gram and being charcterized by a surface coated solely with hydroxyl groups; the polymer characterized by a plurality of side groups of the formula

wherein R is a radical selected from the group consisting of alkyl, aryl, and aralkyl radicals attached to carbon atoms in the polymer chain, the carbon atoms being separated by at least one atom in the chain; heating the mixture while maintaining the components in intimate contact, preferably by the application of shear and compressive forces, e.g., a masticating action, to a temperature at least equal to the softening temperature of the polymer component of the mixture, for a time sufficient to effect cross-linking of the polymer chains through the silica particles; and, if a structure is to be formed, forming the mixture into a structure.

An additional step of treating the cross-linked material to provide additional improvements is optional. This additional step will be called "curing" in the present specification. Curing may be effected with or without the aid of curing agents. It is preferred to cure the cross-linked product after the product has been formed into a shaped structure. Alternatively, the curing step may be carried out in the milling step, i.e., prior to the shaping or film-forming operation, but after cross-linking through silica particles is complete.

The process of the invention is essentially a solid state reaction wherein at least one of a group of specific polymeric components is forced to flow around and past particles of silica in a shearing type of action. In the preferred procedure, from 25% to 75% of silica is milled with the polymer on heated rolls as in a rubber-milling apparatus. The rolls are maintained at or above the softening temperature of the polymer. The temperature should be sufficiently high to retain the milled mass upon the rolls without excessive adherence of the mass to the rolls. The temperature, however, must be below that causing, in combination with the masticating action of the rubber mill, degradation of the polymer. For the polymeric materials useful in the present invention, a temperature of 90° C.–140° C. is adequate. During milling, the initially cloudy mixture is gradually transformed into a relatively transparent mass. This reaction, a chemical combination of silica and polymer, is usually accompanied by the evolution of vaporous by-products, i.e., alcohols of the R radical in the side group. The mass is then formed into a sheet or film by known expedients, such as by calendering or rolling the mass into a sheet or film.

Evidence of chemical interaction between acrylate esters or acrylate ester copolymers and particulate silica when combined in accordance with the present invention (rubber-milling) has been obtained by collecting the vapors evolved during rubber-milling of these components. In a typical example, the vapors evolved during milling of n-butyl acrylate/acrylonitrile (65/35) copolymer with 40%, by weight, of "Cab-O-Sil" at 135° C. were drawn through a series of traps cooled in a Dry-Ice methanol bath. An n-butyl 3,5-dinitrobenzoyl derivative was prepared with the n-butyl alcohol evolved in accordance with the procedure of Lipscomb and Baker, J. Am. Chem. Soc., 64, 179 (1942), melted at 61° C.–63° C. The melting point was not depressed when the derivative was mixed with an authentic sample of n-butyl 3,5-dinitrobenzoate. The sample weighed 0.005 gram, corresponding to 0.027 milliequivalent of n-butyl alcohol which was the vaporous component collected during the milling operation.

Although the technique of rubber-milling is preferred in the process, other techniques which bring about a similar type of mechanical action upon the mixed masses of the two components may likewise be employed to form a reaction mass which may then be formed into sheets, films, and similar type structures. The initial reactive components may be brought into intimate association in substantially solid form in various types of mixers which exert a masticating type of action upon the mass, and a typical type of mixer which may be employed is the Banbury. On the other hand, the initial dispersion of the silica particles into the polymer may be brought about by dispersing silica particles in a solution of polymer in a solvent. If the dispersion can then be maintained until the solvent is evaporated from the dispersion-solution, a residue of relatively uniformly dispersed silica particles in polymer is obtained in the form, in most cases, of a powdery material. This material may then be pressed under conditions of super atmospheric pressure and elevated temperatures to cause considerable flow of polymeric component and effect more intimate contact between the components. The resulting sheet may be substantially uniform at this stage, or it may be necessary to complete the formation of the sheet of polymer/silica reaction product by calendering or rolling the sheet at an elevated temperature.

Any other means or technique may be employed to bring about reaction between the subject components of this invention provided that the components are brought together under forces which bring about flow of the polymer, shearing forces between particulate silica and the polymer, and conditions of elevated temperatures and compressive forces. It is believed that the reactive components of this invention must be brought together under these conditions which provide for bringing relatively high concentrations of the individual components into intimate contact.

The additional curing step may be performed by the use of an additional heating step, preferably at a temperature above that used in the milling step and preferably in combination with a curing agent. The type of curing agent will depend upon the particular polymeric material reacted with silica.

Compounds capable of generating free radicals, such as benzoyl peroxide, tertiary-butyl perbenzoate, and other types of peroxides, are highly useful for effecting curing of the reaction products of alkyl acrylate copolymers, particularly those of ethylene and alkyl acrylates, with particulate silica. The use of curing agents which generate free radicals normally effects further cross-linking of polymer chains in the form of single bonds between carbon atoms in different chains.

On the other hand, curing may be effected by the use of agents which actually enter or form the complete link between different chains of the polymer/silica reaction product. Such types of curing agents include sulfur and various isocyanates such as toluene diisocyanate, and amines such as triethylene tetramine, and oxides such as lead oxide, and certain acids such as stearic acid. These agents are useful to effect curing of copolymers of substituted ethylenes, e.g., vinyl chloride, vinylidene chloride, vinyl acetate or acrylonitrile, and alkyl acrylate, after the copolymers have been cross-linked with particulate silica.

THE SILICA PARTICLES

Silica particles suitable for use in accordance with the present invention must meet at least two qualifications. Each particle must have a specific surface area (in relation to its mass) of at least 100 square meters per gram and each particle must have a surface of only hydroxyl groups. The specific surface area of the silica particles may be determined by nitrogen adsorption. Since the nitrogen molecule has a diameter of less than 0.5 millimicron, it can penetrate essentially all the pores of silica particles useful in this invention, and the nitrogen is readily adsorbed by all of the exposed surfaces. A method for measuring specific surface areas by nitrogen adsorption is given in an article, "A New Method for Measuring Surface Areas of Finely Divided Materials and for Determining the Size of Particles" by P. H. Emmett in the publication "Symposium on New Methods for Particle Size Determination in the Sub-Sieve Range," published by the American Society for Testing Materials, March 4, 1941, page 95. The particulate silica having a hydroxyl surface may be illustrated by the following structural configuration:

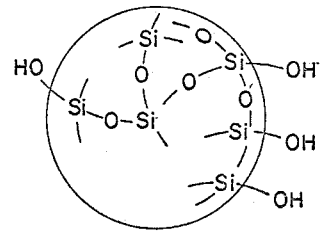

Such silica particles may be referred to in alternative terms: They may be referred to as hydrophilic silica, meaning that the material is wetted by water. On the other hand, the silica having a silanol surface, i.e., covered with a monolayer of hydroxyl groups, may be referred to as hydrated silica or a hydrated solid silica acid or polysilicic acid, the monolayer of hydroxyl groups being called "bound water." According to Ralph K. Iler, in "The Colloid Chemistry of Silica and Silicates" (published 1955), when this type of silica is "heated to 500° C.–600° C., this layer (the monolayer of hydroxyl groups) is partly removed without sintering the silica; part of the surface is left in a dehydrated oxide condition which will not physically adsorb water or methyl red dye (as does the hydroxylated surface), but which can be slowly rehydrated upon exposure to water." Furthermore, Iler states that:

"(1) Physically adsorbed water is removed by drying to constant rate at 115° C.

"(2) Water remaining on silica gel at 115° C. is present as a layer of hydroxyl groups on the silica surface; this 'bound water' content is proportional to the surface area of the gel.

"(3) Water evolved between 115° C. and about 600° C. comes from dehydration of the surface hydroxyl groups, without appreciable loss in area of the silica surface.

"(4) Above 600° C. there is sintering with loss of silica surface and simultaneous loss of water, but the number of remaining hydroxyl groups per unit area remains constant."

The silica particles employed in forming the present products must be relatively non-porous unless the porosity of particles to be reacted with polymer is due to a state of aggregation which can be broken down during the process of this invention to form discrete silica particles having a surface area of at least 100 square meters per gram. The particle size (size of the greatest dimension of a particle or the diameter in the case of spherical particles) of discrete, substantially non-porous silica particles is usually within the range from 0.001 micron to about 0.1 micron. Aggregates, which break down during the process of this invention, may be as large as 1 micron or greater.

The particles may be naturally formed or synthetically prepared in accordance with a variety of known techniques. The material may be entirely amorphous or contain a crystalline component. Although the preferred siliceous material is wholly amorphous falling within the class of materials known as colloidal silicas, the individual particles may be aggregates of discrete colloidal particles. In the case of dry colloidal particles of silica containing silanol surfaces, aggregation apparently always occurs owing to the spontaneous attraction between very small particles. According to Iler, "The main problem in making a useful finely divided silica is to prevent the formation of such strong and compact aggregates that the individual or ultimate particles cannot later be separated." Hence, during the process of intimately associating (by mechanical means) the polymer and the preferred types of silica, the supercolloidal aggregates break down into particles of colloidal size.

The following techniques are most useful for preparing silica particles for use in the present invention:

(1) A siliceous aerogel may be formed by gelling silicic acid in an alcohol-water solution and then converting the gel to an aerogel. This may be carried out by replacing most of the water of the gel with alcohol, heating the gel in an autoclave above the critical temperature of alcohol so that there is no meniscus between the liquid and gas phases and venting the vapors. In this way the liquid phase is removed without subjecting the gelled structure to the compressive forces due to the surface tension of the liquid-gas interface. A pulverized light fluffy powder of silica particles may then be formed by pulverizing the dry aerogel.

(2) Colloidal silicas may be prepared by vaporizing silicon dioxide at high temperatures or producing silicon vapor by burning ethyl silicate or silicon tetrachloride and thereafter collecting the "silica fume."

(3) Still another technique of preparing colloidal silicas is to precipitate silica from aqueous solution in such form that it can be dried to give a fine powder.

It should be mentioned that it is dfficult, if not impossible, in most cases, to reduce by mechanical means the particle size of hard naturally-occurring silicas, such as sand, to form smaller particles of satisfactory specific surface area.

The names and sources of various types of available silica particles are specified in the following table, Table I. Only those marked by an asterisk are suitable in the present invention. It will be noted that "Valron" Estersil, which is an alkyl-esterified silica, does not provide the results of the present invention. This serves to emphasize the critical requirement that the silica particles have a surface coated solely with hydroxyl groups. The presence of alkoxy groups cannot be tolerated.

*Table I*

| Name | Manufacturer | Ultimate Particle Size (microns) | Specific Surface Area (m.²/g.) |
|---|---|---|---|
| "Celite" | Johns-Manville Co. | over 1 | 20 |
| *"Hi-Sil" | Columbia-Southern Co. | 0.025 | 100 |
| *Aerosil | Dow-Corning Corp. | 0.004–0.020 | 300–350 |
| *Aerosil | Godfrey L. Cabot, Inc. | 0.015–0.020 | 175–200 |
| *"Syloid" 244 | Davison Chemical Co. | (¹) | 290 |
| "Valron" Estersil | E. I. du Pont de Nemours. | 0.008–0.010 | 275–325 |
| *"Cab-O-Sil" | Godfrey L. Cabot, Inc. | 0.015–0.022 | 175–200 |
| "Superfloss" | Johns-Manville Co. | 2–4 | 20–25 |

¹ Aggregates break down to form ultimate particles having a specific surface area of about 290 m.²/g. or greater.

SATURATED ORGANIC POLYMERS

As the polymeric component of this invention, there may be employed any saturated organic polymer containing a plurality of functional side groups of the formula

wherein R is an alkyl, aryl or aralkyl radical directly attached to carbon atoms in the polymer chain, said carbon atoms being separated by at least one atom in the chain, said side groups being capable of condensation with hydroxyl groups under the defined conditions of intimate association (e.g., rubber-milling) and heat to effect partial removal of said side groups in the form of an alcohol leaving a siloxy

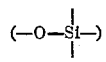

group and at least a

linkage between the siloxy group and the polymer chain. General classes of compounds which are reactable with particulate silicas according to the process of the present invention includes various polyalkyl acrylates, copolymers of alkyl acrylates, with other copolymerizable monomers, various other glycol acrylates such as methyl Cellosolve acrylate and copolymers thereof with other copolymerizable monomers. Specific examples of other saturated linear thermoplastic film-forming polymers which may be reacted with silica within the scope of the present invention are copolymers of methyl Cellosolve acrylate/acrylonitrile, copolymers of butyl Cellosolve acrylate/acrylonitrile, and the following copolymers of alkyl acrylates: ethyl acrylate/methyl acrylate/vinyl acetate, ethyl acrylate/2-ethyl hexy acrylate/acrylonitrile, ethyl acrylate/dimethyl maleate/acrylonitrile, ethyl acrylate/octyldecyl methacrylate/acrylonitrile, ethyl acrylate/acrylonitrile, ethyl acrylate/vinyl chloride, ethyl acrylate/vinylidene chloride, ethyl acrylate/methyl acrylate, methyl acrylate/vinyl acetate, methyl acrylate/ethyl acrylate/acrylonitrile, butyl acrylate/vinylidene chloride, butyl acrylate/vinyl chloride, butyl acrylate/acrylonitrile, butyl acrylate/methyl methacrylate, butyl acrylate/ethyl methacrylate, and copolymers of acrylates with ethylenic hydrocarbons, such as a copolymer of ethylene and methyl or ethyl acrylate, or methyl Cellosolve acrylate. These polymers all contain side groups of the general formula

wherein R is a radical selected from the group consisting of alkyl, aryl and aralkyl radicals which side groups are reactive with hydroxyl groups according to the mechanism hereinbefore specified. Preferably, R is an alkyl radical containing up to 4 carbon atoms. It is also preferred that the remaining valence of each chain carbon atom, to which a reactive side group is attached, be satisfied by a monovalent element such as H or F. The phrase "alkyl, aryl and aralkyl radicals" is meant to include the radicals specified as well as substituted radicals wherein the substitution does not alter the reactivity of the radical, i.e., its capacity to form alcohols by condensation with hydroxyl groups.

Typical reaction between saturated organic polymers and particulate silica may be represented by the following:

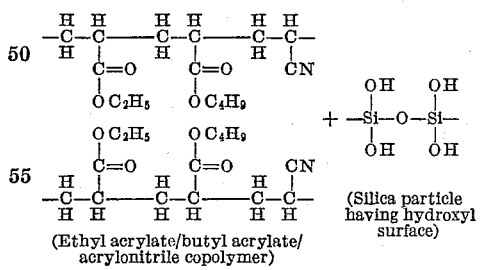

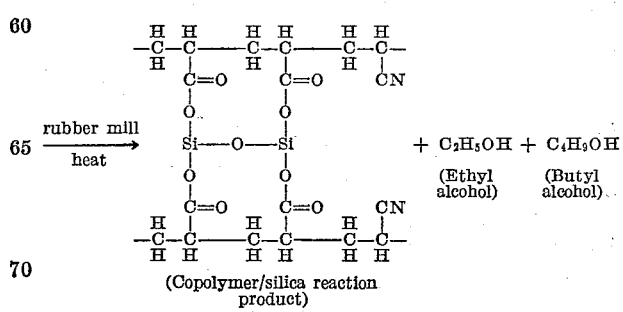

The following specific examples further illustrate the principles and practice of the invention. Parts and percentages are by weight unless otherwise indicated.

Under all circumstances, unless otherwise specified, the reaction was carried out by milling the polymer and silica particles together on a rubber mill having steam heated rolls heated to a temperature within the range from 90° C.–140° C. The polymer was initially added to the hot, stainless steel rolls, and then the silica particles were slowly fed to the milling polymer. The total time of milling was maintained within a duration of about 7–20 minutes. In each case, a control film was prepared by rubber-milling each polymer composition with no silica.

The films were formed by melt-pressing the rubber-milled mass of polymer and silica particles in a press between ferrotype plates at a temperature of about 110° C. for 10 minutes. The film was cooled under pressure before removing it from plates at room temperature.

In the following examples, 1–8, illustrative of the preparation of uncured products, the particulate silica employed was "Cab-O-Sil" which has an ultimate particle size in the neighborhood of 0.015–0.022 micron and a specific surface area within the range from 175–200 m.²/g. The physical properties of film formed from the various reaction products prepared as described above are summarized in the following table, Table II.

load of 20 lbs./sq. inch per film cross-sectional area for no more or less than 5±0.4 seconds. The test is carried out by placing the sample in contact with a heated bar, the proper load being previously applied, and determining the length of time required for failure. This is carried out at various temperatures until the zero strength temperature is determined.

The following examples, 9–13, illustrate the curing steps and the improvement in properties resulting from the curing step. In each example, the acrylate copolymers were rubber-milled with particulate silica, with or without a curing agent, at 90° C.–120° C. for about 10 minutes. All films wherein the properties are expressed as MD (machine direction) and TD (transverse direction) were fabricated by rolling the rubber-milled polymer-silica product into a film at 50° C. Films having properties expressed in only one direction were melt-pressed into film by pressing the rubber-milled polymer-silica product at about 120° C.

EXAMPLE 9

Ethylene/methyl acrylate copolymer (1/1 mol ratio).
 (A) Straight polymer—no silica and no cure.

Table II

| EXAMPLES | POLYMER | SiO₂ Percent | Tensile Strength (p.s.i.) | Elongation, Percent | Modulus (p.s.i.) | Tear (g./mil) | Zero Strength Temperature °C. |
|---|---|---|---|---|---|---|---|
| 1 | n-BA/VCl (3/2) | 0 | 972 | 421 | 1,172 | 96 | 190 |
|   |                | 42 | 4,041 | 227 | 31,400 | 181 | >300 |
| 2 | EA/VCl₂ (4/1) | 0 | 241 | 960 | 9,426 | 110 | 130 |
|   |               | 45 | 2,380 | 940 | 38,144 | 380 | >300 |
| 3 | MA | 0 | 500 | 754 | 2,130 | 48 | 100 |
|   |    | 45 | 1,650 | 215 | 82,500 | 202 | 239 |
| 4 | EA/AN (4/1) | 0 | 930 | 806 | 1,408 | 45 | 75 |
|   |             | 35 | 2,450 | 400 | 35,000 | 300 | 275 |
| 5 | MCA/AN (2.3/1) | 0 | 110 | 600 | 125 | 9 | 175 |
|   |                | 45 | 2,750 | 270 | 9,000 | 450 | 300 |
| 6 | MA/EA/AN (1.5/7.5/1) | 0 | 507 | 830 | 289 | 28 | 270 |
|   |                       | 40 | 1,700 | 852 | 35,759 | 331 | 300 |
| 7 | EA/VA/AN (4.5/1/1) | 0 | 815 | 618 | 35,761 | 39 | ---------- |
|   |                    | 45 | 2,593 | 699 | 68,417 | 316 | ---------- |
| 8 | n-BA/EMA (1/1.5) | 0 | 952 | 347 | 1,075 | 14 | 100 |
|   |                  | 45 | 2,016 | 233 | 51,400 | 34 | 250 |

CODE n-BA—n-butyl acrylate.
EA—ethyl acrylate.
MA—methyl acrylate.
VCl₂—vinylidene chloride.
EMA—ethyl methacrylate.
AN—acrylonitrile.
MCA—methyl Cellosolve acrylate.
VA—vinyl acetate.

The physical properties set forth in Table II were measured in accordance with the following:

*Tensile strength.*—The tensile strength of the present film structures is based upon the initial cross-sectional area of the sample. Tensile strength at break is determined by elongating the film sample at a rate of 100% per minute until the film sample breaks.

*Elongation.*—The value of elongation represents the extent to which the film is extended at breakage. Elongation is effected at the rate of 100% per minute.

*Initial tensile modulus.*—Initial tensile modulus is a measure of film stiffness, i.e., the higher the modulus the greater the stiffness. Modulus is taken from the slope of the initial or Hookian portion of the stress-strain curve at 1% elongation, the film being elongated at the rate of 100% per minute.

*Tear strength.*—The specimens used in this test are 2″ x 2½″. An initial cut of 1″ in length is made in the lengthwise direction. The specimen is placed between jaws which separate at the rate of 10″/minute. The maximum force required to continue the above initial tear for an additional 1½″ is recorded. This maximum force is then divided by the sample thickness to give tear strength in grams/mil.

*Zero strength temperature.*—The zero strength temperature is that temperature at which a film supports a (B) Polymer containing 35% "Hi-Sil" and 2% of benzoyl peroxide (curing agent). Rubber-milled at 90° C. and cured at 150° C. by pressing.

|  | A | B |
|---|---|---|
| Tensile Strength (p.s.i.) | 14.5 | MD 841 / TD 1,012 |
| Elongation (percent) | 917 | MD 482 / TD 551 |
| Modulus (p.s.i.) | 235 | MD 3,094 / TD 2,950 |
| Tear Strength (g./mil) | 20 | MD 89.5 / TD 75.7 |

EXAMPLE 10

Ethyl acrylate/acrylonitrile (4/1 weight ratio–2.2/1 mol ratio). Properties of uncured film containing 40% "Cab-O-Sil":

Tensile strength _____ 2500
    Elongation _____ 400
    Modulus _____ 40,000
    Tear strength _____ 125
    Zero strength temperature _____ 200

Properties of the cured polymer are given below. The curing agent in this case was 1 part by weight of the weight of polymer of triethylene tetramine which was added to an emulsion of the polymer during its preparation. The cured polymer also contained 40% "Cab-O-Sil." The film was cured during the rubber-milling operation which was at 120° C.

Tensile strength:
MD ............................................. 3,773
TD ............................................. 4,040
Elongation:
MD ............................................. 340
TD ............................................. 454
Modulus:
MD ............................................. 46,410
TD ............................................. 39,185
Tear strength:
MD ............................................. 21
TD ............................................. 26
Zero strength temperature ................. 275

EXAMPLE 11

Ethyl acrylate/butyl acrylate/acrylonitrile (weight ratios of 78–9–13) (11.7/1/3.5 mol ratio). Rubber-milled with 40% "Cab-O-Sil" at 120° C. Control with no cure had tenacity of 1500 p.s.i. Cured material was cured by adding 1% of lead oxide on the rubber mill at 120° C. The cured material had a tensile strength of 2400 p.s.i.

EXAMPLE 12

Butyl acrylate/acrylonitrile with 30% "Cab-O-Sil" was rubber-milled at 120 C. It was given a cure using a combination of the following curing agents:

1% stearic acid
0.67% sulfur
1.3% triethylene tetramine

The film was cured under pressure at 175° C. The resulting product was a rubber-like sheet.

EXAMPLE 13

The polymer-silica reaction products of this invention may be calendered or rolled into the form of unsupported or supported sheets or films.

Referring to Example 1, the reaction product of n-butyl acrylate/vinyl chloride copolymer and silica was calendered, after its formation on a rubber mill, onto a non-woven cotton fabric. The resulting product was suitable for use as an upholstery material.

The essential advantage of the present invention is that it provides for the preparation of new polymers capable of being formed into sheets, films, coatings, filaments, rods, tubes or similar formed structures having unique and highly useful combinations of physical properties. The variety of formed structures which may be fabricated from the new polymers of this invention are useful in a myriad of applications. Many of the saturated, linear thermoplastic film-forming polymers which may be reacted with particulate silica in accordance with the present invention are inherently weak materials having particularly low strength under slightly elevated temperatures. The present process provides for reacting a relatively inexpensive particulate silica with such polymers to form new polymers having a combination of surprisingly elevated and useful strength properties in film form.

The present process is highly versatile in that the products may be tailored to specific end uses by varying the amount and the type of particulate silica in the polymer/silica system. Although relatively minor amounts of silica, as low as 10%, by weight, of the total composition, may be reacted with polymer, the benefits of the present invention are realized when at least 25% of silica is reacted with polymer. In general, the overall useful range of silica concentration extends from about 25%–75%; and for many types of end uses the preferred amount of silica is in the neighborhood of 50%.

When polymers within the scope of the present invention are combined with silica, the range of physical properties of the resulting products in film form vary within wide limits. The softer the initial polymer, the softer will be the polymer/silica products; and in the case of reacting initially stiffer polymers with silica, the resulting polymer/silica products will be relatively stiff.

For special end uses the properties of the products of this invention may be made more adaptable by stretching or drawing them in one or two directions.

In general, the products of this invention in the form of such structures as sheets, films, coatings, filaments, rods, tubes, and the like are useful as or for conversion into fabric replacement films in upholstery applications, wearing apparel, such as rainwear, shower curtains, draperies, inflatable toys, tablecloths, suit liners, yard goods, wall coverings, furniture covers, garment bags, card table covers, aprons, in the form of tapes for bandage material, tarpaulins, luggage covers and the like.

It has been found the luminescent pigments may be readily incorporated into the polymer-silica products of this invention, and the resulting products formed into luminescent sheets, films, and the like. In view of the fact that the present products are highly useful in film form without plasticizers and various types of metallic stabilizers, the luminescent pigments, such as barium, calcium and strontium sulfides impart effective luminosity to these sheets, films, and the like, when they are exposed for short periods to light. Such luminescent films are useful for wearing apparel, e.g., policemen's capes, for decorative applications, and the like.

We claim:
1. A process for cross-linking polymeric materials which comprises milling at a temperature of 90° C.–140° C. a mixture of a saturated thermoplastic organic polymer and 25% to 75%, based on the weight of the mixture, of finely-divided particles of silica as the sole cross-linking agent; said particles having their greatest dimension within the range of 0.001–0.1 micron, having a specific surface area of at least 100 square meters per gram and being characterized by a surface coated solely with hydroxyl groups; said polymer characterized by polymeric chains and a plurality of side groups of the formula

wherein R is a radical selected from the group consisting of alkyl, aryl and aralkyl radicals, said side groups attached directly to carbon atoms in the polymer chain, the carbon atoms being separated from each other by at least one atom in the chain.

2. A process as in claim 1 wherein R is an alkyl group having 1 to 4 carbon atoms.

3. A process as in claim 1 wherein the saturated thermoplastic organic polymer is an alkyl acrylate polymer.

4. A process as in claim 1 wherein the saturated thermoplastic organic polymer is a copolymer of ethylene and at least one alkyl acrylate.

5. A process as in claim 1 wherein the saturated thermoplastic organic polymer is a copolymer of at least one substituted ethylene selected from the group consisting of vinyl chloride, vinylidene chloride, vinyl acetate, and acrylonitrile and at least one alkyl acrylate.

6. A process as in claim 1 wherein the saturated thermoplastic organic polymer is a polymer of methyl acrylate.

7. A process as in claim 1 wherein the saturated thermoplastic organic polymer is a polymer of ethyl acrylate.

8. A process as in claim 1 wherein the saturated thermoplastic organic polymer is a polymer of n-butyl acrylate.

9. A process as in claim 1 wherein the cross-linked polymeric material is heated to a temperature above the milling temperature.

10. A process as in claim 1 wherein the cross-linked polymeric material is heated under pressure to a temperature above the milling temperature.

11. A process as in claim 3 wherein a compound selected from the group consisting of benzoyl peroxide and tertiary-butyl perbenzoate is added to the cross-linked polymeric material and the polymeric material is heated to a temperature at least equal to the milling temperature.

12. A process as in claim 5 wherein a compound selected from the group consisting of sulfur, toluene diisocyanate, triethylene tetramine, lead oxide, and stearic acid is added to the cross-linked polymeric material and the material is heated to a temperature at least equal to the milling temperature.

References Cited in the file of this patent

UNITED STATES PATENTS

| | | |
|---|---|---|
| 2,517,014 | Miller et al. | Aug. 1, 1950 |
| 2,527,329 | Powers et al. | Oct. 24, 1950 |
| 2,681,327 | Brown | June 15, 1954 |

OTHER REFERENCES

Mason et al.: "The Technology of Plastics and Resins," published 1945 by Van Nostrand, page 312.